United States Patent [19]
Jensen et al.

[11] 3,877,771
[45] Apr. 15, 1975

[54] APPARATUS FOR THE SOLDERLESS SPLICING OF MULTI-LEAD CABLES

[76] Inventors: Leo Anker Jensen, Dalvej 15, Viby J.; Svend Christensen, Parkvangen 4, Solbjerg, both of Denmark

[22] Filed: July 25, 1974

[21] Appl. No.: 491,669

Related U.S. Application Data
[60] Division of Ser. No. 390,215, Aug. 21, 1973

[30] Foreign Application Priority Data
Aug. 21, 1972  Denmark .......................... 4126/72

[52] U.S. Cl. .............. 339/19; 174/88 R; 339/99 R; 339/147 R
[51] Int. Cl. ............................................. H01r 9/08
[58] Field of Search ................ 339/19, 95, 97–99, 339/147; 174/88 R, 92

[56] References Cited
UNITED STATES PATENTS

| | | | |
|---|---|---|---|
| 3,112,147 | 11/1963 | Pferd et al. | 339/97 P |
| 3,496,522 | 2/1970 | Ellis, Jr. et al. | 339/99 R |
| 3,836,942 | 9/1974 | Knickerbocker | 339/97 R |

Primary Examiner—Joseph H. McGlynn
Attorney, Agent, or Firm—Edward F. Levy

[57] ABSTRACT

Apparatus for the solderless splicing of a multi-element cable such as a telephone cable comprising a novel splicing device consisting of a cable retaining member and a top member mountable thereon and carrying a plurality of incisive connectors having depending legs with a cutting slot therein. For splicing two cables, the cable ends are first inserted and mounted in the opposite ends of the cable retaining member, the leads of each cable are laid out in a corresponding sequential order in slots at the opposite sides of the member, and the top member is inserted over the cable carrying member so that the incisive connectors engage the individual leads of both cables, cut through the insulation thereof, and make electrical contact with the wire within each lead to interconnect the leads of the two cables. For splicing a cable to the leads of outside branch wires, the cable leads are laid out in the slots at one side of the cable retaining member, the top member is inserted thereon, and individual branching clips carrying the branch leads are inserted at the other side of the device.

10 Claims, 19 Drawing Figures

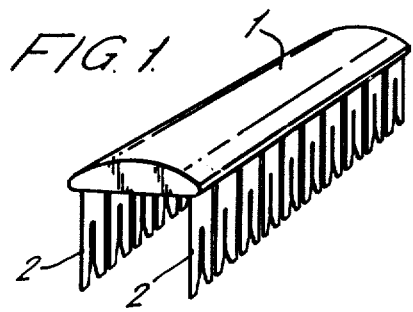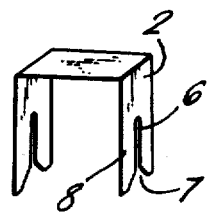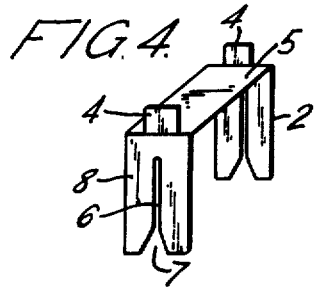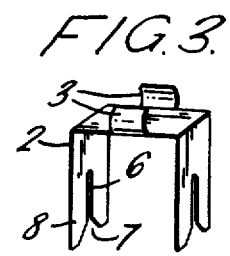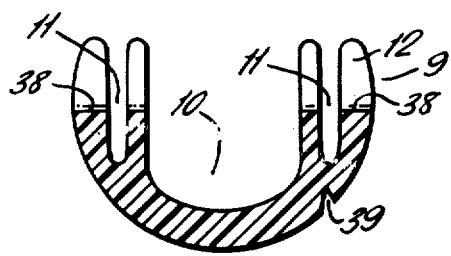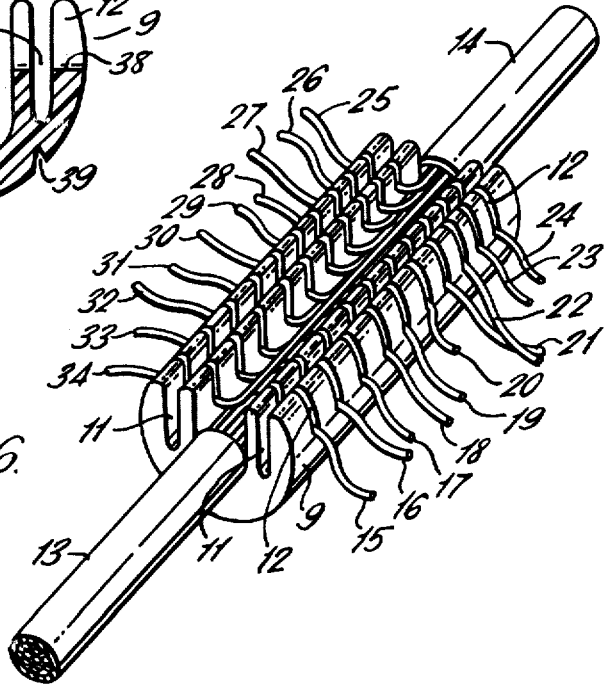

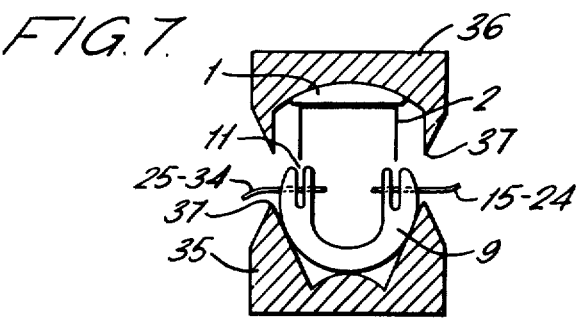
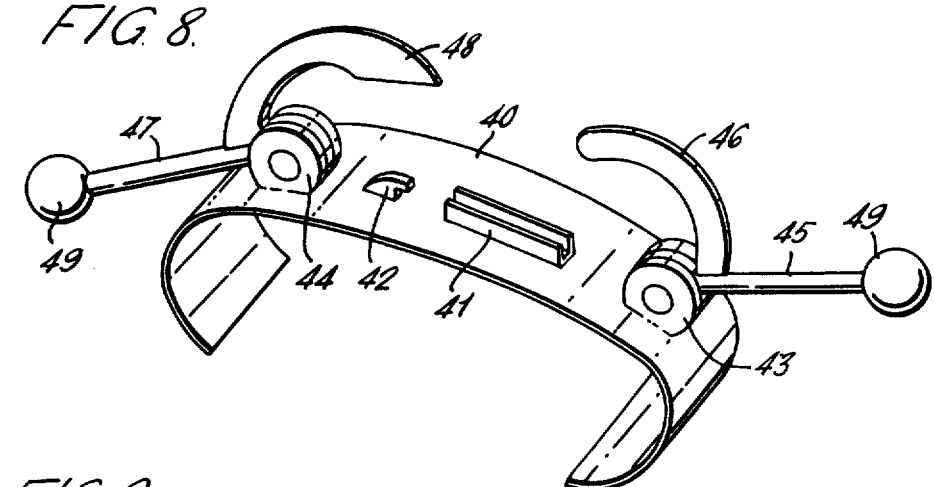
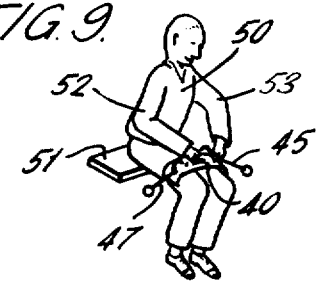
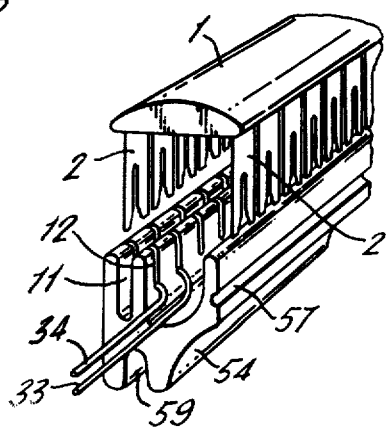

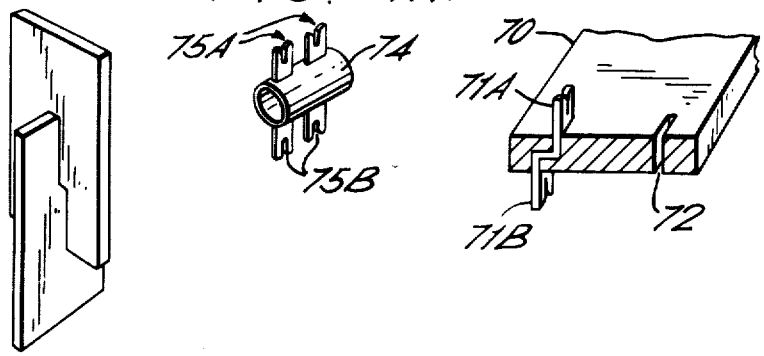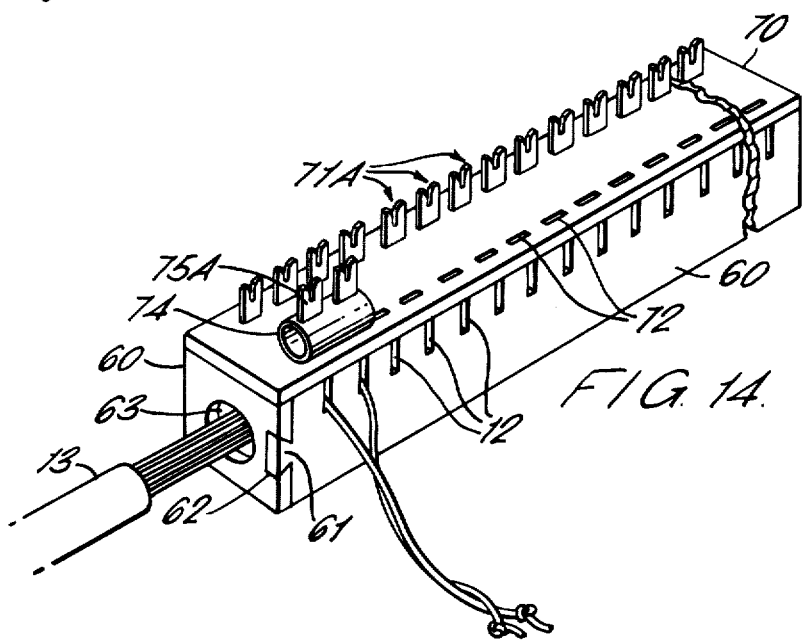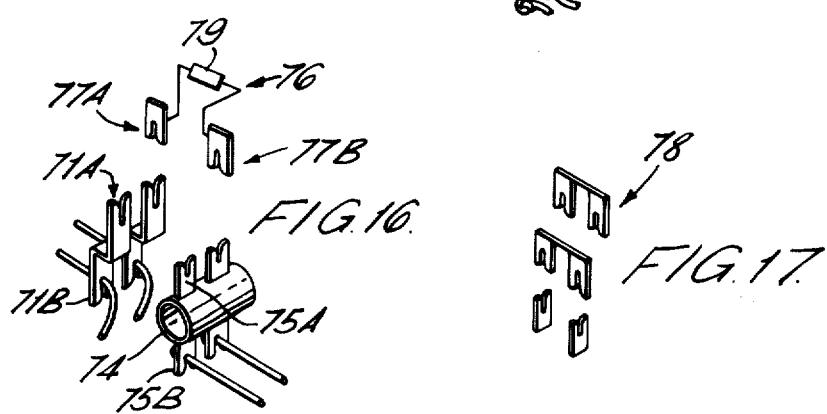

APPARATUS FOR THE SOLDERLESS SPLICING OF MULTI-LEAD CABLES

This application is a division of our co-pending United States patent application Ser. No. 390,215 filed Aug. 21, 1973 and entitled "Method And Apparatus for the Solderless Splicing of Multi-Lead Cables."

The present invention relates to apparatus for the solderless splicing of cables such as telephone cables containing a large number of individual leads.

The apparatus of the invention is applicable to splicing techniques which employ incisive connectors having U-shaped bodies with a pair of legs each formed with a cutting slot which receives the end of an electrical lead, cuts through the insulation thereon, and makes electrical contact with the metal wire therein. The apparatus is used by a method of systematically laying out the individual cable leads in a retaining member which member subsequently constitutes a part of the completed splice.

Methods and apparatus of this type are generally known and have been described in patents and literature, the most pertinent known to applicants being: U.S. Pat. No. 3,202,957, Swedish Pat. No. 192,890, Swedish published patent specification No. 308,338, and two publications of Minnesota Mining and Manufacturing Company entitled "3M Practice, Section 3, Modular System Splicing" and "3M Practice, Pedestal Cabinets, Section 3, Cross-Connect Systems."

The aforementioned prior art, however is subject to substantial shortcomings and disadvantages. Thus, the making of a splice according to known techniques is complicated and cumbersome, and often requires the use of complex and expensive tools. In addition, the known splice techniques require the use of a large number of components, many of which are supplied as separate parts.

In utilizing conventional splicing techniques, it is necessary to take special measures in order to hold the cables and cable leads in correct positions before and during the splicing operation. In one instance, it is required to lace together the leads of the cables on one side of the splice location, which is not only a difficult and time-consuming operation, but also results in a large lateral protrusion of leads, which are easily damaged. In other instances, the protruding and superfluous end portions of the cable leads are cut off, either by individual manual clipping or by means of cutting knives placed in the splicing members and remaining therein after the splicing operation. Both instances result in an unreliable splice, with the possibility of checking the correctness of the wire trimming made difficult, if not impossible.

It is an object of the present invention to provide an improved splicing apparatus which is simple, easy to use even by an unskilled operator, and which eliminates the aforementioned disadvantages of the conventional splicing techniques.

Another object of the invention is the provision of splicing apparatus of the character described which is effective to produce a cable splice which has a small cross section, and no protruding parts, in which the connections and cut-off portions can be readily checked, which provides, a suitable transfer of tensile forces in both the joined cables themselves and in the individual leads thereof, and in which the splice may be utilized in a considerably versatile manner both for the splicing together of two cables with widely differing numbers of leads therein, and for joining a cable to branch connections such as the kind used in the distributing frames of telephone companies.

Still another object of the invention is the provision of splicing apparatus of the character described in which the leads to be connected may be laid out in proper order with great ease, even by an unskilled service man, thus preventing incorrect interconnection of leads and eliminating the need for subsequent checking of the individual connections.

A further object of the invention is the provision of splicing apparatus of the character described which is composed of only a few parts, namely a cable-retaining member, and a member carrying a plurality of incisive connectors, the cable retaining member being of such construction that it can be used for the splicing of the leads of two cables mounted therein, or can be used for the splicing of the leads of a single cable to branch leads, by a simple and easy alteration of the structure of the cable retaining member and the use of a number of branching clips. The alteration of the member may be readily made by the service man in the field.

In accordance with the invention there is provided a splicing device comprising a cable retaining member having means for mounting a stripped end of a cable immovably therein, and a row of spaced slots along one side thereof for individually receiving and holding the leads of said cable, and a top member of insulated material carrying a plurality of depending incisive connector members having cutting slots therein, said connector members being positioned to engage the respective mounted cable leads in the cutting slots thereof when said top member is pressed into engagement with the cable retaining member, whereby the connector members cut through the insulation of the mounted cable leads and make electrical contact with the wire therein.

In one form, the splicing device is made to receive and splice together two cables, and to mount the end of one cable at one end thereof. The cable retaining member has a row of slots at each side thereof, one row receiving and mounting the leads of the first cable and the other row receiving and mounting the leads of the other cable in selective alignment with the mounted leads of the first cable. The connector members carried by the top member having U-shaped bodies with depending legs at each end, so arranged that when the top member is inserted on position upon the cable retaining member one leg of each connector member engages one lead of the first cable and the other lead engages the aligned lead of the second cable, whereby all leads of both cables are simultaneously spliced and electrically connected.

In another form of the invention, the cable device is made for splicing the leads of a cable to outside branch wires, and one side of the cable retaining member is constructed to permit the individual insertion of branch clips carrying the branch leads in such a manner that the branch leads are received in the cutting slots of the second row of legs of the incisive connectors, whereby the branch leads are electrically connected to the mounted cable leads through said incisive connectors.

In another form of the invention the splicing device is constructed to serve a dual function in splicing together the leads of two cables, as well as splicing the leads of one cable to the leads of branch wires, or other outside connectors.

Additional objects and advantages of the invention will become apparent during the course of the following specification when taken in connection with the accompanying drawings, in which:

FIG. 1 is a perspective view of the top member of a splicing device made in accordance with the present invention, the top member carrying a plurality of incisive connectors;

FIGS. 2-4 are perspective views of different forms of incisive connectors which may be mounted on the top member of FIG. 1.

FIG. 5 is a transverse section through a channel-shaped cable retaining member constituting part of the splicing device of the present invention;

FIG. 6 is a top perspective view of the cable retaining member of FIG. 5, showing two cable end portions mounted therein, with the individual leads thereof extending through rows of slots at each side of the member;

FIG. 7 is a sectional view in schematic form, showing the upper and lower sections of a closing tool respectively mounting the top member of FIG. 1 and the cable retaining member of FIG. 6, and in position to be closed to perform the splicing operation;

FIG. 8 is a perspective view of an embodiment of an appliance adapted to hold the cable carrying member and press the top member into mounted position thereon;

FIG. 9 is a perspective view showing the manner in which the appliance of FIG. 8 may be held and operated by a service man;

FIGS. 10 and 12 are perspective views of different embodiments of splicing devices made in accordance with the invention and adapted for use in making branched connections from a cable;

Figure 11:
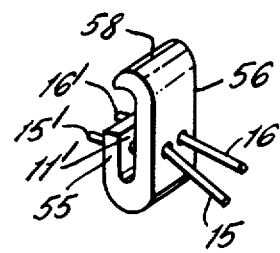
FIG. 11 is an enlarged perspective view of a clip carrying branching leads and adapted to be used in the devices of FIGS. 10 and 12.

FIG. 14 is a perspective view of another embodiment of splicing device made in accordance with the present invention and adapted to establish connections between individual leads or pairs of leads of a mounted cable and outside subscriber wires, as in a distributing frame or a subscriber terminal frame; and FIGS. 14A, 14B, 15, 16 and 17 are enlarged perspective views of the various lead coupling components and their connecting components used in the splicing device of FIG. 14.

Referring in detail to the drawings, FIGS. 1 and 6 show the elements of a splicing device made in accordance with the present invention. In FIG. 1 the numeral 1 designates a top member of the device, which top member 1 is made from a highly insulating plastic, such as high quality PVC, and is adapted to mount a plurality of incisive connectors 2, of the type shown in FIGS. 2, 3 or 4.

The incisive connectors shown in FIGS. 1 to 13 are all generally designated by the reference numeral 2, regardless of the manner in which they attached to the top member 1, since their operative structure is essentially identical. The incisive connector 2 shown in FIG. 2 has no special attachment lugs, but has a flat upper surface which may be secured to the under surface of the top member 1 by any suitable known means, such as by bonding with a two-component adhesive, by riveting, screw attachment, or the like.

The incisive connector 2 shown in FIG. 3 carries an upstanding attachment lug 3 at each side, which lugs 3 may be embedded in the top member 1, or, if necessary, be pressed into transverse slots in the lower portion of top member 1.

The embodiment of the incisive connector 2 shown in FIG. 4 carries an upstanding attachment lug 4 at each end. If desired, these lugs 4 may be produced by stamping from the top wall 5 of the connector 2. The lugs 4 may be received in longitudinal attachment slots (not shown) in the top member 1 to attach the connector to the top member. It will follow that in utilizing this embodiment of the incisive connector 2, the top member 1 may be produced by extrusion and subsequent cutting to measure.

Each of the incisive connectors 2 has spaced pairs of forked legs 8 defining therebetween an elongated cutting slot 6. The width of each slot 6 is just sufficient to cut through the insulating coating of an electrical lead and with certainty make contact with the metal wire therein, without risk of damaging the wire. For use with the leads of telephone cables, the slot 6 may, for example, have a width of 0.38 mm. At the entrance to each slot 6 is a convergent mouth 7 which may be formed by angular, tapered cuts in the end of the forked leg 8.

FIGS. 5 and 6 show a cable retaining member 9 which constitutes the second element of the splicing device. The member 9 has a central, longitudinal cable groove 10 which preferably is slightly narrower than the cable to be placed in it, so that the cable to some extent will be frictionally held within the groove 10. On each side of the cable groove 10 there is a longitudinal slot 11. The width of each slot 11 corresponds to the thickness of the forked legs 8 on the U-shaped incisive connectors 2.

A row of spaced transverse slots 12 extend across the cable retaining member 9 on the face thereof, which is oriented upward in FIGS. 5 and 6. When the top member 1 is properly placed on the cable retaining member 9, the incisive connectors 2 are so located that their cutting slots 6 are aligned with the respective transverse slots 12. The distance between the transverse slots 12 is somewhat greater that the width of the forked legs 8 on connectors 2, so that the incisive connectors 2 may be mounted with suitable insulating distances therebetween.

In splicing cable, the insulating covering or armouring is removed from two cable ends 13 and 14 and the latter are placed in the ends of a cable retaining member 9, as shown in FIG. 6. The exposed leads 15-24 from the cable 13 are each placed singly in a respective transverse slot 12 on the right-hand side of the cable retaining member 9, as viewed in FIG. 6. Similarly, the individual leads 25—34 of the cable 14 are each placed in a respective transverse slot 12 on the left-hand side of the cable retaining member 9.

To accomplish the joining of the two cables 13 and 14, the top member 1, with its incisive connectors 2 facing downwardly, is brought into engagement with the cable retaining member 9 in such a manner that each of the connector forked legs 8 and its associated cutting slot 6 engages a lead end 15-25 or 25-34 respectively. Each connector 2 thus acts as a conductive bridge to establish an electrical connection between the opposed leads 15 and 34, 16 and 33, etc. In mounting the leads in slots 12, the ends of the leads have been selectively arranged with the color coded leads of the cable aligned with each other on the right-hand and left-hand sides of cable retaining member 9, so that insertion of the top member 1 will produce an effective cable joint or splice. This joint or splice does not require checking by individual testing of the various established connections, by measuring or "ringing through."

The aforementioned splicing operation may be facilitated by the use of a closing tool, such as illustrated in FIG. 7. This closing tool comprises a lower section 35 supporting the cable retaining member 9, and an upper section 36 arranged to engage or, if necessary, hold the top member 2 during the splicing operation. The upper section 36 is formed with cutting edges 37, and the lower section 35 may also be formed with similar cutting edges 37 if necessary. These cutting edges 37 are positioned to pass closely along the outside of the cable retaining member 9 and cut off the ends of the leads which project outside slots 12, as the upper member 36 is moved toward the lower section 35. During this cutting operation, the bottom walls 38 of slots 12 provide a firm support for the end portions of the leads. As shown in FIG. 5, the bottom wall 38 of each transverse slot 12 may be seen to be located considerable higher than the bottom wall of longitudinal slot 11 so that when the connectors 2 are inserted fully in the slots 11, the mounted leads will be located well upwardly within the cutting slots 6.

The splicing operation depicted in FIG. 7 may, if desired, be carried out by using an appliance as shown in FIG. 8. Such appliance comprises as a stiff lap brace 40 adapted to engage the tops and outer sides of a person's lightly-spread thighs. On the top surface of the C-shaped lap brace are a bracket 41 and a stop member 42 arranged to permit the rapid and accurate placement and mounting of the aforementioned splicing members. The lap brace 40 also carries two pivots 43 and 44 adjacent its ends, about which respective bell-crank levers 45, 46 and 47, 48 are pivotally mounted. The manually-operable arms 45 and 47 of the bell-crank levers terminate in ball handles 49. Both arms 46 and 48 may be adapted to exert a clamping force during splicing or joining operation, or the arm 46 may be adapted to exert such clamping force, while arm 48 is adapted to cut off the protruding ends of the cable leads.

FIG. 9 indicates the manner in which a telephone service man 50 may use the appliance of FIG. 8 in the field, while seated upon plank 51, a stool or merely on the bank of a trench. It will be seen that by spreading his thighs slightly to hold the lap brace 40 firmly, the service man has freedom of both arms 52 and 53 for use in placing the individual leads of the cables in the transverse slots of the cable retaining member 9, and subsequently operating the levers 45 and 47 with his hands.

As shown in FIG. 5, the cable retaining member 9 is formed with a sharp-bottomed weakening notch or score line 39 which is located directly below one of the longitudinal slots 11. This notch or score line 11 enables the extreme right-hand portion of the cable retaining member 9 to be broken off, either manually, or by use of a knife, screwdriver, or other tool. If the right-hand portion of the cable retaining member 9 is broken off along the score line, the reduced member may be used in a different manner for the splicing of branch connection, as will be presently described.

FIG. 10 illustrates another embodiment of splicing device made in accordance with the invention, the device being shown at the beginning of a splicing operation. The top member 1 carrying the incisive connectors 2 is identical in construction to that shown in FIGS. 1 and 7, but the cable retaining member 54 is of different construction and is preferably made of plastic material by extrusion.

The cable retaining member 54 is formed with transverse slots 12 only on its left-hand side as viewed in FIG. 10. The right-hand side is positioned so that its outer face is spaced a short distance from the inner faces of the forked legs of the incisive connectors 2 at the right-hand side of the top member 1, when the latter is inserted in splicing position.

FIG. 11 shows a branching member 56 in the form of a clip having an upturned leg 55, a plurality of such branching members 56 being intended for use with the cable retaining member 54. Each branching member 56 has one or more apertures therein for receiving one or more electrical leads, such as the leads 15 and 16 shown in FIG. 11, which leads are connected to lines external of the cable being spliced. The mounted leads extend across a central slot 11' in the branching clip 56.

In use of the splicing device of FIG. 10 to form branch connections, the cable leads 33, 34, etc, are inserted in the transverse slots 12 at one side of the cable retaining member 54, and the top member 1 is forced downwardly upon the latter until the depending incisive connectors 2 at one side enter longitudinal slot 11 and engage, cut and make electrical connection with the mounted cable leads. Thereafter one or more branching clips 56 are inserted at the right-hand side of the cable retaining member 54. Each branching clip 56 is inserted upwardly from below, so that its leg 55 slides upwardly within the space between the right-hand row of forked legs of incisive connectors 2 and the right-hand outer wall surface of the cable retaining member 54. When the branching clip 56 is so inserted, the two branch leads 15 and 16 carried by the branching clip 56 are electrically connected to the two cable leads 33 and 34, shown mounted in FIG. 10, by the first two incisive connectors 2 of the top member 1. Additional leads, or a single pair of leads may be so connected by use of the branching clips.

During the aformentioned branch splicing operation, the slot 11' of the branching clip 56 receives the right-handed forked leg 8 of a connector 2, and outermost ends of the branch leads 15' and 16' are finally pressed into a longitudinal groove 57 in the cable retaining member 54, thereby serving in part to secure the branching clip 56 in mounted position by friction. The securing of the clip 56 may further be effected by means of an inwardly-directed resilient hook member or catch 58 at the top of said clip, which hook member 58 is adapted to engage and grasp the upper surface of the top member 1 when the joining operation is completed.

The branch connection provided by the branching clips 56 is used when it is desired to branch out the individual leads of a cable, for example to distribute connections from the leads of one cable to the leads of one or more other cables. In such cases, it may be appropriate to use a second corresponding row of branching members or clips, placed symmetrically opposite the first set of branching clips.

As shown in FIG. 10, the cable retaining member is provided with a downwardly facing groove 59, which may be used for holding the member during the splicing operation or for attaching the member to some support after the operation.

Figure 12:
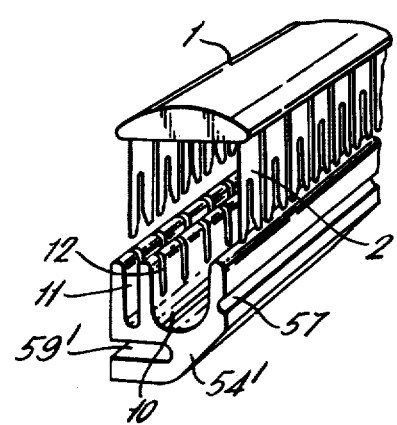

FIG. 12, shows a slightly modified embodiment of splicing device which is identical to that of FIG. 10, except that the cable retaining member 54' is provided with a longitudinal groove 59' on left-hand side thereof, rather than at the bottom. The groove 59' is intended for use with side attachment means.

Instead of using specially-designed cable retaining members, such as the members 54 or 54' of FIGS. 10 and 12, for making branch connections, it is possible to use the cable retaining member 9 of FIG. 5 in altered form. For this purpose the cable retaining member 9 is broken along score line 39, removing the portion of the member to the right of score line 39 and the longitudinal slot 11. This leaves a single upstanding wall on the right hand side of the cable retaining member 9, which is used for mounting the branching clips.

Figure 13:
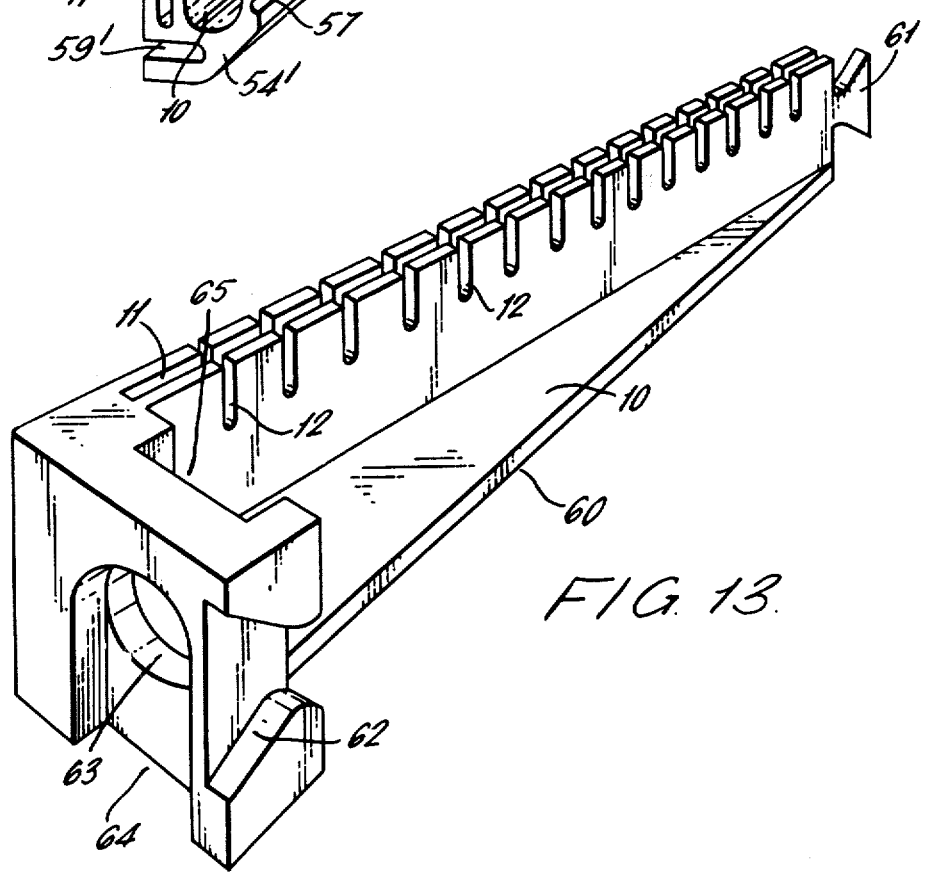
FIG. 13 is a perspective view of a half section of another form of cable retaining member made in accordance with the invention.

FIG. 13 illustrates another embodiment of splicing device which may be used for both branching off splicing and plain splicing of cable ends. This device comprises two identical triangular half sections 60, one of which is reversed and placed against the other to form a rectangular structure. Each half section 60 is formed with a dovetail stud 61 at its narrow end and a dovetail slot 62 at its wide end. In assembled position the dovetail stud 61 of each half section 60 is received in the slot 62 of the other half section to prevent longitudinal movement of the half sections relative to each other.

Each half section 60 has a circular hole 63 sized to fit snugly around an inserted cable, and formed by a combination of a downwardly-forcing U-shaped recess 64 and an offset, upwardly-facing U-shaped recess. By forming the hole 63 in this manner, it is possible to manufacture the half section 60 by simple pressure molding or casting without undercut parts which would complicate the manufacturing process or the removal from the mold, or require the use of loose cores.

The use of a cable retaining member formed of two half sections 60 facilitates to a maximum extent the correct placing of cable ends and the laying out of the lead ends, particularly under difficult field conditions, for example where a service man with thick fingers is working in the open in cold weather. Thus, in performing the splicing operation, the fitter may process each half section 60 separately, thus inserting a cable and its leads in one half section, then inserting a second cable and its leads, or branch connections, in the other half section, and thereafter assembling the two half sections 60 and locking them together by means of the studs 61 and slots 62. Such separate processing makes it possible to obtain ample space and good working conditions while laying out the lead ends in proper order.

FIGS. 14 to 17 illustrate the manner in which the splicing device of the invention may be employed for establishing branch connections at the end of a casing, using fuses where necessary to protect against the flow of excessive current from the branch lines. FIG. 14 shows a cable retaining member formed by the assembly of two half sections 60 of the type shown in FIG. 13. The open upper end of the assembled member is covered by a top member 70 which, as shown in FIG. 14B, carries along one side thereof a plurality of incisive connectors having upstanding forked legs 71A, depending forked legs 71B, and an offset central portion embedded in the body of top member 70. The depending forked legs 71B are adapted to be inserted in the longitudinal slot 11 (FIG. 13) of the corresponding half section 60 for engaging an inserted cable lead, while the upstanding forked legs 71A are adapted to be connected to a fuse link 76, shown in FIG. 16, or to a shorting link 78 of the type shown in FIG. 7, or to other connecting, testing or measuring devices.

The opposite side of the top member 70 has a row of elongated apertures 72 overlying the slot 11 in the right-hand half section 60. These apertures 72 are sized and positioned to receive the depending legs 75B of double connector plugs 74, of the type shown in FIG. 14A.

After the end of a cable 13 is inserted in the hole 63 as previously described, the individual cable leads are selectively distributed in the transverse slots 12 at the left-hand side of the assembled cable retaining member shown in FIG. 14. When the top member 70 is mounted by pressing down against the cable retaining member, the depending forked legs 71B will establish connection with the leads in the slots 12, in the manner previously described. It is now possible to connect the terminated cable leads, for example by pairs of leads to subscriber wires or in a distributing frame. This is done by first inserting such external wires in the slots 12 of the right-hand half section 60, and then inserting the legs 75B of a double connector plug 74 in the slots 72, as shown in FIG. 4, thus establishing electrical and mechanical connection with the inserted lead wires. Both the depending legs 75B and upstanding legs 75A are forked legs of the same type as the forked legs 8 of FIGS. 2–3 with cutting slots 6 and convergent mouths 7.

When the aforementioned operations have been completed, the individual leads of the cable may be connected to pairs of subscriber wires by means of a fuse link 76. One of the bifurcated legs 77A of the fuse link 76 engages the upstanding forked leg 71A of an incisive connector, and the outer leg 77B of the fuse link engages an upstanding leg 75A of the double plug 74, as shown in FIG. 16. In this view most of the metal parts of the components are shown bare, for clarity of illustration. It will be understood, however that such metal parts, such as those of the fuse link 76 and its fuse 79 may be covered with or embedded in insulation such as plastic material.

When the use of a fuse link 76 is not required, as in the case of a distributing frame in which the opposite ends of the interconnecting wires are connected with fuses, the fuse link 76 may be replaced by a simple shorting link 78 (FIG. 17) having forked legs similar to those previously described.

It will be seen in FIG. 15 that when two forked legs are turned perpendicularly and interconnected, a double contact connection is provided. This double contact is effected in part by gripping engagement of the forked legs of a first connector with the second connector, and in part by the gripping engagement of the forked legs of the second connector with the body of the first connector. These two contact connections are in parallel, resulting in a contact of improved reliability.

It will be appreciated that the joining principle illustrated in FIGS. 14-17 may be utilized in many ways. When for example, a fault is suspected in a subscriber line, the two fuse links 76 of the suspected line may be removed and replaced by a specially constructed four-pronged plug, which is permently connected to suitable test equipment. After having inserted the four-pronged plug on the upstanding forked legs of the subscriber line and of the cable pair, the interconnected cable pair of said cable 13 may be tested simultaneously with the testing of the subscriber line, the relevant parts of the test equipment being connected to the relevant prongs on the four-pronged plug.

It will be appreciated that after any of the previously described splicing devices have completed the splicing operation, the cable retaining member and top member remain as permanent parts of the splice. To insure that these splicing members are held together securely and firmly, the members, and the associated components constituting the completed splice, may be encased or sheathed in a plastic covering, which has the added advantages of providing an insulating jacket over the spliced area, as well as providing a water-tight and air-tight seal. This covering may be provided by a sheath or sleeve of plastic material which is placed over the spliced area, including the ends of the cable or cables, and is then reduced by heat shrinkage in the well-known matter, to encase the splicing parts tightly.

It will be seen that since the pair of members constituting the various embodiments of splicing devices described above are of particularly simple construction, they are well suited to mass production in plastic, and in some forms may be produced in indeterminate length, being cut to measure for use.

While preferred embodiments of the invention have been shown and described herein, it is obvious that numerous additions, changes and omissions may be made in such embodiments without departing from the spirit and scope of the invention.

What we claim is:

1. A splicing device for solderless splicing of a multi-lead cable such as a telephone cable to another cable or to outside wiring, said device comprising a channel-shaped cable retaining member having an open top and having an end portion sized to receive and retain the end portion of a cable in mounted position therein, said cable retaining member having a narrow groove extending along at least one side thereof and plurality of spaced transverse slots extending perpendicularly across said groove, each of said slots being sized to receive therein an inserted lead of the cable mounted in said cable retaining member, said device also comprising a top member of insulating material mounting a plurality of spaced incisive connectors, arranged in at least one longitudinal row, each of said connectors having a forked depending leg defining a central cutting slot therein, said legs being so spaced from each other that the distance between cutting slots in adjacent legs in said longitudinal row is equal to the distance between the spaced transverse slots in said cable retaining member, said top member being sized for insertion in aligned mounted position upon said cable retaining member to cover over the open top thereof, said row of incisive connectors being positioned on said top member such that the depending legs of said connectors enter the narrow groove of said cable retaining member when the top member is inserted in mounted position thereon.

2. A splicing device according to claim 1 in which said cable retaining member has an elongated integral body portion having a central longitudinal groove extending the length thereof, said groove being sized to receive and mount a cable end portion at each end thereof, said body portion also having a pair of narrow grooves extending along the respective sides thereof and bordering said central longitudinal groove, and a plurality of spaced transverse slots extending across each of said narrow grooves, with the transverse slots at one side of said cable retaining member adapted to receive the inserted leads of one of said mounted cables and the transverse slots at the other side of said cable being adapted to receive the inserted leads of the other of said mounted cables, each of the incisive connectors on said top member being U-shaped and having a pair of interconnected, spaced depending legs, the legs of each said pair being spaced apart by a distance equal to the spacing between said narrow grooves, whereby when said top member is inserted in mounted position, one leg of each pair will enter one narrow groove and the other leg of each pair will enter the opposite narrow groove.

3. A splicing device according to claim 2 in which each of said incisive connectors has a plurality of attachment lugs sized to be attached to said top member for mounting said incisive connector thereon.

4. A splicing device according to claim 2 in which the distance between the pair of depending legs of each incisive connector is such that in said mounted position of the top member a surface of each leg bears snugly against an internal surface of the corresponding narrow groove.

5. A splicing device according to claim 1 in which said cable retaining member comprises two identical half-sections sized and shaped to be assembled in interfitting position in which they form the completed cable retaining member, each of the half-sections having locking means positioned to interengage in the assembled position of said half-sections to lock the latter against relative movement in the longitudinal direction of the mounted cable.

6. A splicing device according to claim 5 in which said locking means comprises a dovetail stud on one end of each half-section and a complementary dovetail notch on the other end of each half section.

7. A splicing device according to claim 1 in which said cable retaining member has only a single narrow slot along one side thereof, the opposite side of said cable retaining member having an upstanding wall, and in which each of the incisive connectors on said top wall being U-shaped and having a pair of interconnected, spaced depending legs, the legs at one side of each connector being positioned to be received in said narrow groove, and the opposite leg of each connector member being spaced outwardly from said upstanding wall to define a space therebetween in the mounted position of said top member, said splicing device also comprising a plurality of branching clips each having an upstanding leg bordered by a slot, and a plurality of holes sized to receive branch connection leads, said upstanding leg being sized for insertion into the space between said upstanding wall and said connector legs to locate said branching clip in a mounted position in which at least one of said spaced connector legs extends into the slot of said branching clip.

8. A splicing device according to claim 7 in which the upstanding wall of said cable retaining member has a longitudinal groove in the outer surface thereof, said longitudinal groove being aligned with the holes of the mounted branching clip through which the branch connection leads extend.

9. A splicing device according to claim 1 in which each of the incisive connectors mounted along one side of said top member comprises a first forked leg depending from said top member and an integral forked leg upstanding from said top member, said top member also having a row of spaced slots along the opposite side thereof, and said cable retaining member having a row of apertures in alignment with said spaced slots and sized to receive branch connection leads therethrough, said splicing device also comprising at least one double connector plug mounting a pair of incisive connectors, each having an upstanding forked leg and a depending forked leg, said depending forked legs of said double connection plug being sized for insertion through the slots of said top member and into engagement with the branch connection leads therebelow, said splicing device also including a plurality of connecting links each having a pair of spaced forked legs sized and positioned to engage respectively an upstanding forked leg at one side of said top member and an aligned upstanding forked leg at the other side of said top member.

10. A splicing device according to claim 9 in which at least one of said connecting links includes a fuse mounted between the depending legs thereof.

* * * * *